UNITED STATES PATENT OFFICE.

WALDEMAR OSCAR MITSCHERLING, OF WILMINGTON, DELAWARE, ASSIGNOR TO ATLAS POWDER COMPANY, OF WILMINGTON, DELAWARE, A CORPORATION OF DELAWARE.

PROCESS FOR THE PREPARATION AND PRESERVATION OF VISCOSE SOLUTIONS OF CELLULOSE FOR THE PRODUCTION OF FILMS, THREADS, AND FILAMENTS.

1,415,040. Specification of Letters Patent. Patented May 9, 1922.

No Drawing. Application filed February 9, 1922. Serial No. 535,370.

*To all whom it may concern:*

Be it known that I, WALDEMAR OSCAR MITSCHERLING, citizen of the United States, residing at Wilmington, in the county of New Castle and State of Delaware, have invented certain new and useful Improvements in Processes for the Preparation and Preservation of Viscose Solutions of Cellulose for the Production of Films, Threads, and Filaments, of which the following is a specification.

This invention relates to a process for the preparation and preservation of viscose solutions of cellulose for the production of films, threads and filaments. Heretofore it has been common to treat cellulose with a solution of caustic soda and to then treat the resultant press cake, after ageing of the latter, with carbon bisulphide in an amount equal to 40–60% of the weight of the cellulose used. This resulted in giving a straw-colored viscous mass, which upon subjection to a suitable caustic alkali solution of about 10% alkalinity yielded a 5–6% spinning solution of cellulose. Solutions prepared in this manner are unstable and gradually decompose so that the mass sets up to a solid jelly in about a week. In consequence the solution must be spun away before setting up takes place, i. e., usually within about four days from the time the carbon bisulphide ($CS_2$) is used.

It is a well known fact that the threads or films obtained when the solution is fresh are better than when an older solution is used so that the quality of the product varies continuously due to the progressive decomposition of the viscose solution. It is manifest, therefore, that anything which will arrest this decomposition and increase the length of time during which such solutions may be advantageously used is of utility and value. I have discovered that, since in the decomposition of viscose solutions thiosulphates are formed, the addition of a small percentage of sodium-thiosulphate delays the decomposition of the spinning solution materially which makes it possible to get a more uniform product and obviates the necessity of spinning away a solution in four or five days. By using an amount of sodium-thiosulphate equal to one percent of the cellulose used, the keeping qualities of the solutions have been prolonged, at least, to thirty days. The thiosulphate acts as a preservative and prevents or materially retards the decomposition of the cellulose into sugars, or as it is sometimes expressed, into alcohols of the multiple type. The thiosulphate does away with or obviates the addition of sugars, glycerin, and other alcohols of the multiple type which have been used hitherto to prevent or retard the decomposition of the cellulose molecule.

While the proportion of thiosulphate above mentioned has been found effective for the purposes desired it is to be understood that it is not the intention to limit the amount to be used to this particular figure.

Having described by invention, what I claim is:

1. The herein described process of preserving viscose cellulose solutions which consists of adding sodium-thiosulphate to such solutions.

2. The herein described process of preserving viscose cellulose solutions from decomposition which consists of adding sodium-thiosulphate to such solutions in the proportion of one percent of sodium-thiosulphate to the amount of cellulose used in such solution.

In testimony whereof I affix my signature in the presence of two witnesses.

WALDEMAR OSCAR MITSCHERLING.

Witnesses:
FREDERIC BONNET, Jr.,
THOMQAS J. LAFFEY.